United States Patent [19]

Dumond, Jr. et al.

[11] Patent Number: 5,218,629
[45] Date of Patent: Jun. 8, 1993

[54] COMMUNICATION SYSTEM FOR MESSAGE DISPLAY ONBOARD MASS TRANSIT VEHICLES

[75] Inventors: David I. Dumond, Jr.; Barbara J. Brooks, both of Cincinnati, Ohio

[73] Assignee: Public Access Cellular Telephone, Inc., Cincinnati, Ohio

[21] Appl. No.: 351,421

[22] Filed: May 12, 1989

[51] Int. Cl.$^5$ .............................................. H01Q 7/04
[52] U.S. Cl. ...................................... 379/59; 379/58; 340/904; 340/991
[58] Field of Search .................. 379/58, 57, 59; 340/904, 905, 991, 994, 901; 307/9.1, 10.1

[56] References Cited

U.S. PATENT DOCUMENTS

| | | |
|---|---|---|
| Re. 32,365 | 3/1987 | Sebestyen . |
| 3,824,469 | 7/1974 | Ristenbatt . |
| 3,899,671 | 8/1975 | Stover . |
| 3,944,724 | 3/1976 | Kilby et al. . |
| 3,976,995 | 8/1976 | Sebestyen . |
| 3,984,807 | 10/1976 | Haemmig . |
| 4,009,375 | 2/1977 | White et al. . |
| 4,121,052 | 10/1978 | Richard . |
| 4,220,946 | 9/1980 | Henriot . |
| 4,311,876 | 1/1982 | Endo et al. . |
| 4,336,524 | 6/1982 | Levine . |
| 4,350,970 | 9/1982 | von Tomkewitsch . |
| 4,394,649 | 7/1983 | Suchoff et al. . |
| 4,399,330 | 8/1983 | Kuenzel . |
| 4,399,555 | 8/1983 | McDonald et al. ............... 455/33 |
| 4,515,994 | 5/1985 | Bolle et al. ............... 379/58 |
| 4,549,308 | 10/1985 | LoPinto . |
| 4,656,654 | 4/1987 | Dumas . |
| 4,680,786 | 7/1987 | Baker et al. . |
| 4,706,273 | 11/1987 | Spear et al. . |
| 4,737,977 | 4/1988 | Norman ............... 379/58 |
| 4,766,434 | 8/1988 | Matai et al. . |
| 4,788,711 | 11/1988 | Nasco, Jr. . |
| 4,791,571 | 12/1988 | Takahashi et al. ............... 340/994 |
| 4,794,639 | 12/1988 | Urui et al. . |
| 4,797,914 | 1/1989 | Vaello . |
| 4,799,162 | 1/1989 | Shinkawa et al. ............... 340/994 |
| 4,812,843 | 3/1989 | Champion, III et al. ............ 379/57 |

FOREIGN PATENT DOCUMENTS

| | | |
|---|---|---|
| 61-52039 | of 1986 | Japan . |
| 61-52040 | of 1986 | Japan . |
| 1-212637 | 8/1989 | Japan ............................. 340/901 |
| 1162404 | 1/1986 | United Kingdom . |

OTHER PUBLICATIONS

Monk, Newton, "Experimental Radio-Telephone Service for Train Passengers", Nov. 3, 1950, IRE, Detroit, Michigan.

Peuker, W., "Radio-Telephone Interface of the (East German) Railway Central Intercommunication Exchange", Signal & Schiene, (Germany) vol. 20, No. 5 (May 1976).

Kahn, William J., "An Improved Mobile Telephone Control Unit" 27th Annual Conference IEEE Vehicular Technology Grp., Mar. 16, 1977.

(List continued on next page.)

*Primary Examiner*—James L. Dwyer
*Assistant Examiner*—M. Shehata
*Attorney, Agent, or Firm*—Wood, Herron & Evans

[57] ABSTRACT

A communication system for displaying route specific messages onboard a plurality of mass transit vehicles operating along designated routes within a geographical area serviced by a cellular telephone network includes a transmitter connectable to any telephone in the telephone system, the transmitter capable of transmitting messages to any other addressable telephone number in the system, and a cellular based visual communication unit mounted onboard each of the vehicles, each of the units having an addressable telephone number. The transmitter and each cellular based visual communication unit cooperatively assure that the contents of the route specific messages transmitted from the transmitter via the cellular telephone system to the respective vehicle are received, stored and subsequently displayed in an error-free condition, regardless of whether or not the vehicles are mobile or stationary.

16 Claims, 5 Drawing Sheets

OTHER PUBLICATIONS

Ito, Sadao, Kamata, Terumochi, Ogata, Hideo, "Field Tests on High Capacity Mobile Telephone System in 800 MHz Band", Japan Telecommunications Review, Oct. 1977.

Makitalo, Osten, "With Swedish Paging System, You're Only A Phone Call Away", Telephony, May 26, 1980., International Features.

Leitich, Albert J., Linder, Donald L., "Portable Telephones For Cellular System", Vehicular Technology Society IEEE, Sep. 1980.

Bartimo, Jim, "Firm Unveils Cellular Bridge", InfoWorld, Jul. 2, 1984.

Cueugniet, J., Duplessis, P., "Radiocom 2000 Radiotelephone Multiservice Network", Commutation & Transmission N. 2, 1985.

Free, John, "36 Cellular Phones for car, briefcase, even your pocket", Popular Science, Aug. 1985.

Crump, Stuart, Jr., "ABIX Landline Emulator For Cellular", Personal Communications Technology, Jun. 1986.

Cellular Radio Test Set, Product Spot, Marconi Instruments LTD, St. Albans, Herts, UK.

Lambley, Richard, "A Cordless Future", Electronics & Wireless World, Dec. 1988.

Cutler, C. C., "Displayphone: An Interactive Graphical Experiment", Electronic Text Communication Conference, Jun. 1978.

Stockbridge, Christopher, "The Evolution of a Multimode Multilocation Audioconferencing System", Bell Lab., Apr.

Higginbotham, A. F., James, R. L., May, F. T., "Teleconference Systems", IBM Technical Disclosure Bulletin, Feb. 1980.

Ninke, W. H., Brainard, R. C., Ngo, P. D. T., Sosnowski, T. P., "An Experimental Display Telephone", Bell Telephone Lab., Mar. 1976.

COMMUNICATION SYSTEM FOR MESSAGE DISPLAY ONBOARD MASS TRANSIT VEHICLES

FIELD OF THE INVENTION

This invention relates to a communication system that utilizes a cellular telephone network to display route specific messages on mass transmit vehicles.

BACKGROUND OF THE INVENTION

Mass transit systems serve the public interest in alleviating vehicle overcrowding of streets. Unfortunately, it seems that many commuters would simply rather drive a private car than commute to and from work via mass transit. This is due at least in part to the fact that an individual in a private car remains "in touch" with the outside world through news and information heard over the radio, while a mass transit commuter is relatively isolated. To the extent that mass transit systems can be adapted to provide advantages over commuting by private car, or alleviate presently perceived disadvantages of mass transit commuting, these systems will attract more riders and alleviate overcrowding on public roadways, an overcrowding situation which worsens with increasing population and number of vehicles.

Cellular telephone systems enable motorists to converse by telephone with other motorists or with someone located at a land line telephone. Basically, a cellular telephone network includes a geographical area divided into a number of cells, with each cell having a transmitting and receiving station connected to the land line telephone system. As a motorist with a cellular telephone traverses the geographical area, the cellular telephone within the vehicle communicates with the telephone system via radio signals to the station located in the nearest cell, or to the station located in the cell which provides the strongest signal. As the vehicle exits one cell and enters another, the stations of the adjacently located cells "hand off" the communication in order to ensure that the strongest signals are received and transmitted. Hand off also occurs when one cell senses an overload condition due to a high number of users and transfers one or more of the users to an adjacent cell. In other words, a communication link with a cellular telephone may be handed off even though the telephone itself remains stationary. Occasionally, hand off causes some signals to be lost, resulting in missing syllables in a conversation and necessitating repetition of a word or phrase by the speaker. An article entitled "Advance Mobile Phone Service System Description," published on Oct. 12, 1982, describes a cellular telephone system developed by Bell Telephone Laboratories. This article is expressly incorporated herein by reference in its entirety.

Due to increasing popularity, cellular telephone systems have been adapted to a variety of new uses. For instance, Champion, III et al. U.S. Pat. No. 4,812,843 describes an information system in which a subscriber located in a private car may obtain access to information of interest via a cellular telephone. Unfortunately, this system is only available to individual subscribers, and would not be practical for public use on a mass transit vehicle such as a bus, due in part to the fact that the average commute on such a vehicle is only about 15 minutes duration and most passengers would simply not have enough time or room to move freely to a public telephone mounted onboard. Moreover, the ambient noise level on a commuter vehicle such as a bus is generally too high to permit a coherent telephone conversation between a passenger using a cellular telephone and an individual located at a remote telephone.

Vaello U.S. Pat. No. 4,797,914 discloses a conventional pay telephone equipped with a telephone display that can be programmed from a remote site in order to display messages in a time dependent mode to the user of the telephone booth, or at another display mounted nearby. The system utilizes only land line telephone connections, and therefore it does not address any of the problems that are inherent to cellular telephone systems, such as hand off, which would be critical to error-free transmission of messages via the cellular network.

SUMMARY OF THE INVENTION

It is an object of the present invention to provide a cellular based visual communication unit onboard a mass transit vehicle which receives, stores and displays to passengers error-free route specific messages transmitted from a remote location. This system eliminates a heretofore perceived inherent disadvantage of mass transit systems and promotes the use of such systems in order to reduce overcrowding of roadways.

The present invention contemplates a communication system which enables route specific messages to be transmitted error-free from any telephone in the world to each of a plurality of mass transit vehicles operating within a geographic area serviced by a cellular telephone network, each of the messages being particularly pertinent to a designated route within the geographic area and received, stored and displayed onboard a vehicle assigned to travel along that designated route. The content of a route specific message may include general news and information, weather or accident reports, and/or advertising of businesses located along or events to take place along the designated route. A message may include both text and graphics.

To these ends, a communication system for displaying route specific messages includes: a plurality of mass transit vehicles, namely buses, operating within a geographical area served by a cellular telephone network; a telephone system interconnected with the cellular telephone network; an input device, or transmitter, for transmitting messages from any telephone in the system to any other addressable telephone in the system; and a cellular based visual communication unit mounted onboard each of the vehicles and addressable through the telephone system via a telephone number; each cellular based visual communication unit adapted to receive, store and display messages transmitted via the cellular network from the remote transmitter, each message being pertinent to the designated route to which the vehicle has been assigned. The cellular based visual communication units and the transmitter cooperatively assure error-free transmission of messages from the remote telephone to each of the vehicles, regardless of whether the vehicles are moving from cell to cell along a route or stationary, with the engine turned off. This feature is critical to the display of coherent messages.

Each vehicle mounted cellular based visual communication unit includes: a cellular transceiver to receive the transmitted message; a cellular data modem which, along with another modem at the remotely located transmitting site, cooperatively ensures error-free transmission and receipt of the message by the respective cellular based visual communication unit; a microprocessor with attendant RAM serving as a buffer memory to store an incoming message and a main memory which contains the message currently being displayed; and a message board for subsequent display of the message stored in the main memory to passengers onboard the vehicle. While the components of each unit are preferably powered by the vehicle battery, there is also a back up battery connected to the microprocessor to ensure storage of messages if the vehicle battery should fail.

Display of the message may be initiated by someone on the bus by turning on power to the message board, which causes the message stored in the main memory to be displayed. The length of the message is preferably equal to the length of the average bus ride, which is about fifteen minutes. The message runs uninterrupted until all of it has been displayed, and then the message repeats. This continues so long as power is supplied to the message board and no new message is transmitted. A new message transmitted to the unit will be stored in the RAM buffer. An imbedded command at the end of the received data string comprising the new message causes the new message to overwrite the previous message. In other words, once stored in the buffer, the command transfers the received new message from the RAM buffer into the main memory. If desired, during transfer, the board may be programmed to display the message "UPDATING SIGN." Thus, this system provides message updating capability from a remote location in order to keep passengers informed of recent events or special events taking place along the route.

Preferably, the transceiver includes a conventional phone jack for connection of a cellular telephone handset, to enable two way audible conversation between someone onboard the bus and any other telephone in the system. Also, a keyboard mounted adjacent the driver is connected by wire connection to the cellular based communication unit to enable transmission of digital messages from the bus to any other phone in the system. If desired, a thermometer may be mounted to the roof of each vehicle and connected to the unit to display the outside temperature.

Periodically, for instance every day or twice a day depending upon scheduling practices of the transit company, each of the vehicles is assigned to a designated route. Typically, each route has a number designation and each bus has a reference number which for the purpose of this application is assumed to be the telephone number of the cellular transceiver mounted onboard. The route assignments for the buses are communicated to an individual responsible for loading and transmitting the messages to be displayed on the designated routes. The communications to this individual can be made in any number of ways, as by telephone or facsimile transmission from a central dispatcher's office at the transit company, or by the driver of each vehicle using the cellular based visual communication unit, either audibly over the cellular handset or by entering digital commands through the keyboard. The communications must match each of the vehicle with a route designation.

Once this information has been communicated, a cellular telephone link may be established between a remotely located telephone connected anywhere in the telephone system and any one of the buses. The messages are input as alphanumeric characters into a computer connected to the remote telephone. The computer transfers the characters to a modem which transforms the digital data into a modulated analog data stream which is transmitted over the telephone line. Each message is transmitted via cellular connection to the vehicle with the telephone number, or addressable code, corresponding to the designated route for which the message is intended. The messages are received and stored at the respective cellular based visual communication units in error-free condition regardless of whether or not the bus is stationary, or moving from cell to cell along a route.

In accordance with the invention, a method for displaying route specific messages in a plurality of mass transit vehicles operating in a geographical area serviced by a cellular telephone network comprises the steps of: communicating route designations and vehicle telephone numbers for a plurality of mass transit vehicles to an operator; the operator transmitting a route specific message from any telephone in the telephone system via the cellular telephone network to each of the vehicles; receiving and storing the messages in error-free condition at each of the vehicles; and subsequently displaying the stored messages onboard the vehicles.

In an alternative embodiment, both the route designation and the messages may be transmitted independently to definable memory slots of a computer located at a central control station, for subsequent transmission to the vehicles. In this embodiment, for each assigned bus, a route designation/vehicle telephone number pair is entered into the keyboard on the vehicle and transmitted to and stored in a definable memory slot, each slot being dedicated to a known route designation. Meanwhile, an individual at any telephone location in the telephone system may transmit the content of the route specific messages to the control station, with each message being addressed to the definable memory slot dedicated to that particular route. Thereafter, the computer at the central control station transmits all of the stored information, including the imbedded vehicle telephone number, to the vehicle having that particular telephone number. Thus, the need to match up correct route designations, vehicle numbers and route specific messages is alleviated. If desired, this final transmission of messages to the vehicles may be performed automatically by the computer, as described hereafter in the detailed description.

This communication system provides versatility in originating, transmitting and presenting up-to-date route specific messages, i.e., news, traffic information, advertising, to passengers on a mass transit vehicle, thus overcoming one apparently perceived disadvantage of mass transit commuting.

These and other objects and advantages of the invention will be more readily appreciated in light of the following detailed description and the drawings in which:

DETAILED DESCRIPTION OF THE DRAWINGS

Figure 1:
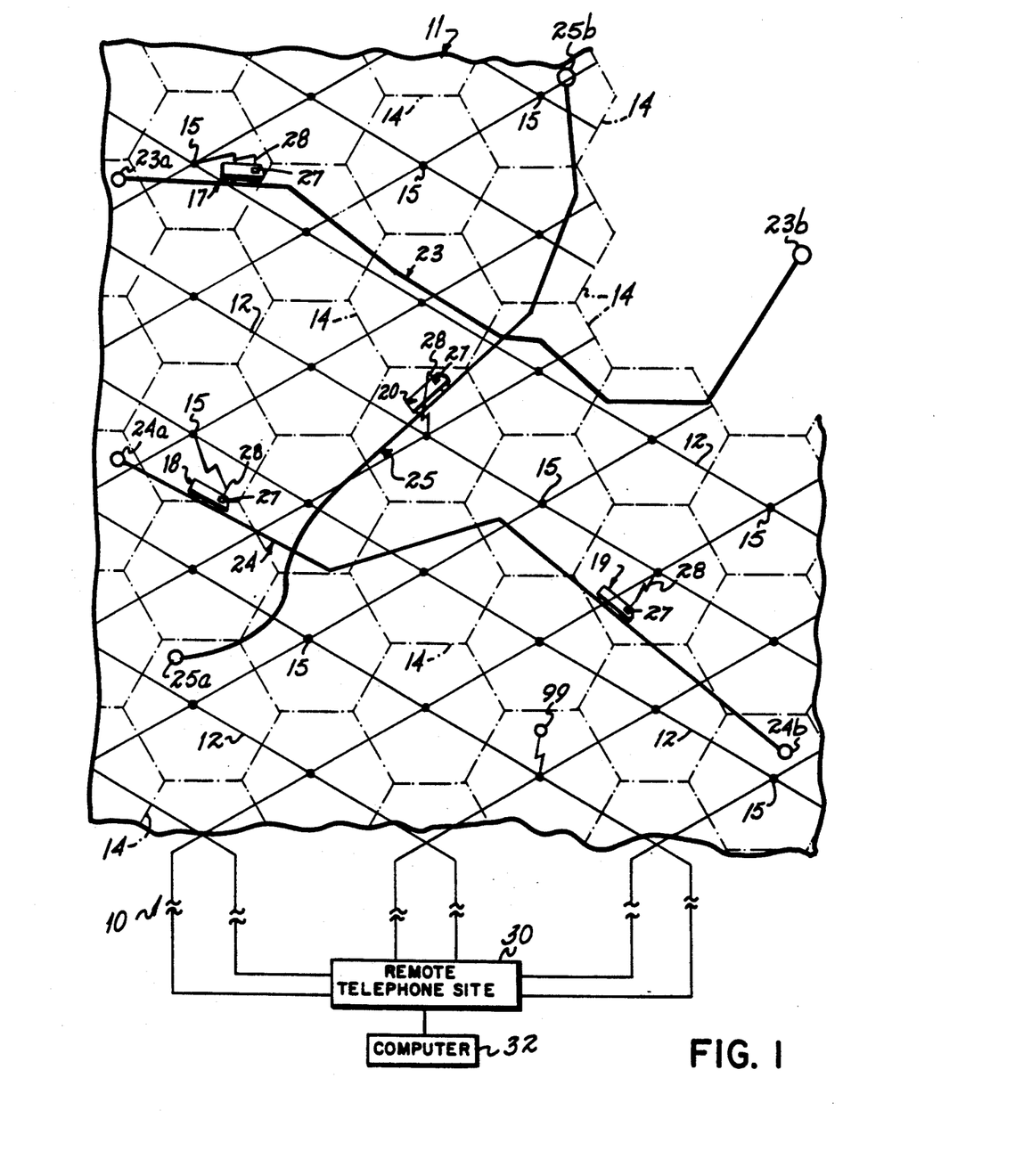
FIG. 1 is a fragmented schematic illustrating a communication system for displaying messages onboard mass transit vehicles in accordance with a preferred embodiment of the invention.

FIG. 1 depicts a telephone system or lattice 10 utilized in the invention. Within the lattice 10 lies a geographical area 11 which is also serviced by a cellular telephone network 12, the cellular network 12 being an interconnected subset of, or within, the telephone system 10. The cellular telephone network 12 is described in the prior incorporated article. Briefly, the network 12 comprises a plurality of hexagonally shaped cells 14 located within the geographical area 11. Each cell 14 includes a centrally located land base station 15 with a transceiver that operatively connects the telephone system 10 with any cellular telephones located within the cell 14. As described in the background, as vehicles move to and from adjacent cells along a street, the signal is handed off to prevent signal loss.

A plurality of vehicles, preferably buses, are numbered 17, 18, 19 and 20, and are shown in FIG. 1. The vehicles traverse designated routes located at least partially within geographical area 11. As shown in FIG. 1, vehicle 17 is located on route 23, vehicles 18 and 19 are located on route 24 and vehicle 20 is located along route 25. Depending upon the availability of the vehicles, rush hour traffic along the routes, and the number of expected passengers, etc., the number of vehicles assigned to a particular route may vary. Typically, based upon availability, most of the buses are assigned every half day, corresponding to peak traffic during morning and evening rush hours. Depending upon the needs of the transit authority, some buses may be assigned to different routes over the course of a day. During service upon a designated route, the vehicle usually displays a number permanently associated with the designated route, and depending upon the direction of travel, the destination located at the endpoint of the route. Endpoints of routes 23-25 are designated in FIG. 1 as 23a and 23b, 24a and 24b and 25a and 25b, respectively.

Onboard each of the Vehicles 17-20 is a cellular based visual communication unit 27 which communicates with the cellular telephone network 12 and its associated stations 15 via an antenna 28. Thus, each vehicle is in telephone communication with any telephone, e.g., land line, or cellular, within the telephone system 10. FIG. 1 shows a remotely located telephone site 30 interconnected with the telephone system 10. By connecting a computer 32 to the telephone site 30 via the appropriate interface hardware, digital data corresponding to the contents of route specific messages can be generated input and transmitted from the remote site 30 to each of the vehicles 17-20 operating within geographical area 11. The data is received by each of the cellular based visual communication units 27, checked to verify error-free transmission, and then stored in memory, as will be explained in more detail later.

Figure 2:
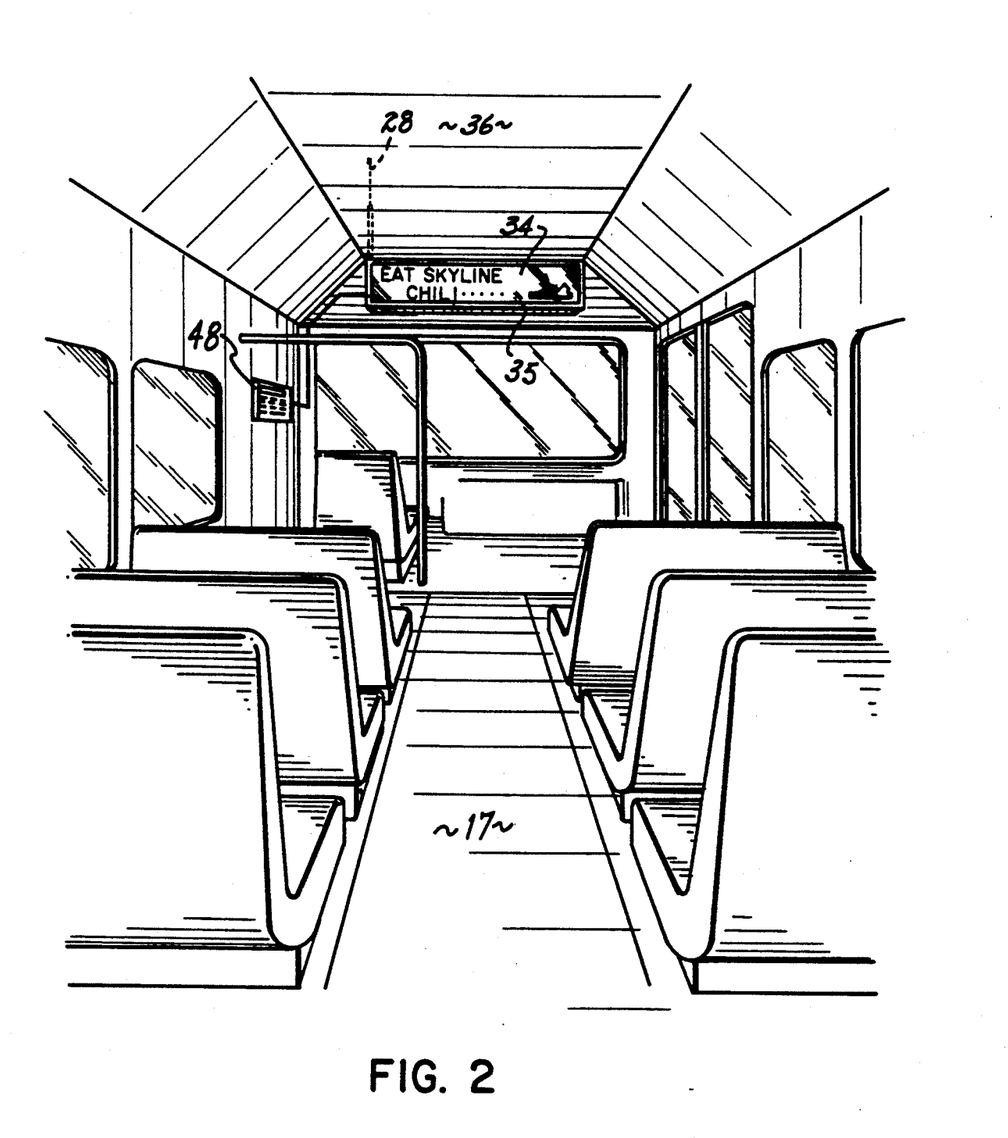
FIG. 2 is a perspective view showing a cellular based visual communication unit mounted onboard a mass transit vehicle in accordance with a preferred embodiment of the invention.

Subsequently, an operator onboard the bus 17, preferably the driver, initiates display of the message to passengers, as shown in FIG. 2. The messages are displayed by an LED display board 34 mounted to the face of an enclosure 35 which houses the other components of the cellular based visual communication unit 27. The enclosure 35 is removably secured to ceiling 36 of the vehicle, and has a hinged door to permit access to the other internal components of unit 27. The enclosure 35 has physical dimensions of about 30" length, about 6" height and about 3¼" depth, though this shape may vary according to the space available on the various types of buses.

The display board 34 includes two custom printed circuit boards that provide logic necessary to drive thirty-eight 5×8 matrix LED blocks arranged in two rows of 19 LED blocks. The board 34 can display either two lines of two inch text alphanumeric characters (16 characters per line) or a single line of four inch text characters (8 characters per line). In presenting text, a variety of presentation modes are available, i.e., open, wipe, scroll, blink, crunch, dissolve, repel, etc. to enhance the visual aspect of presentation. Additionally, the electronic message board 34 or boards provide for a bit mapped display to allow for individual lighting of the LED's in order to create graphic images and animation sequences, such as the skyline graphic shown in FIG. 2. If desired, the computer 32 and the units 27 may be adapted to transmit, receive, store and display messages in color.

Figure 3:
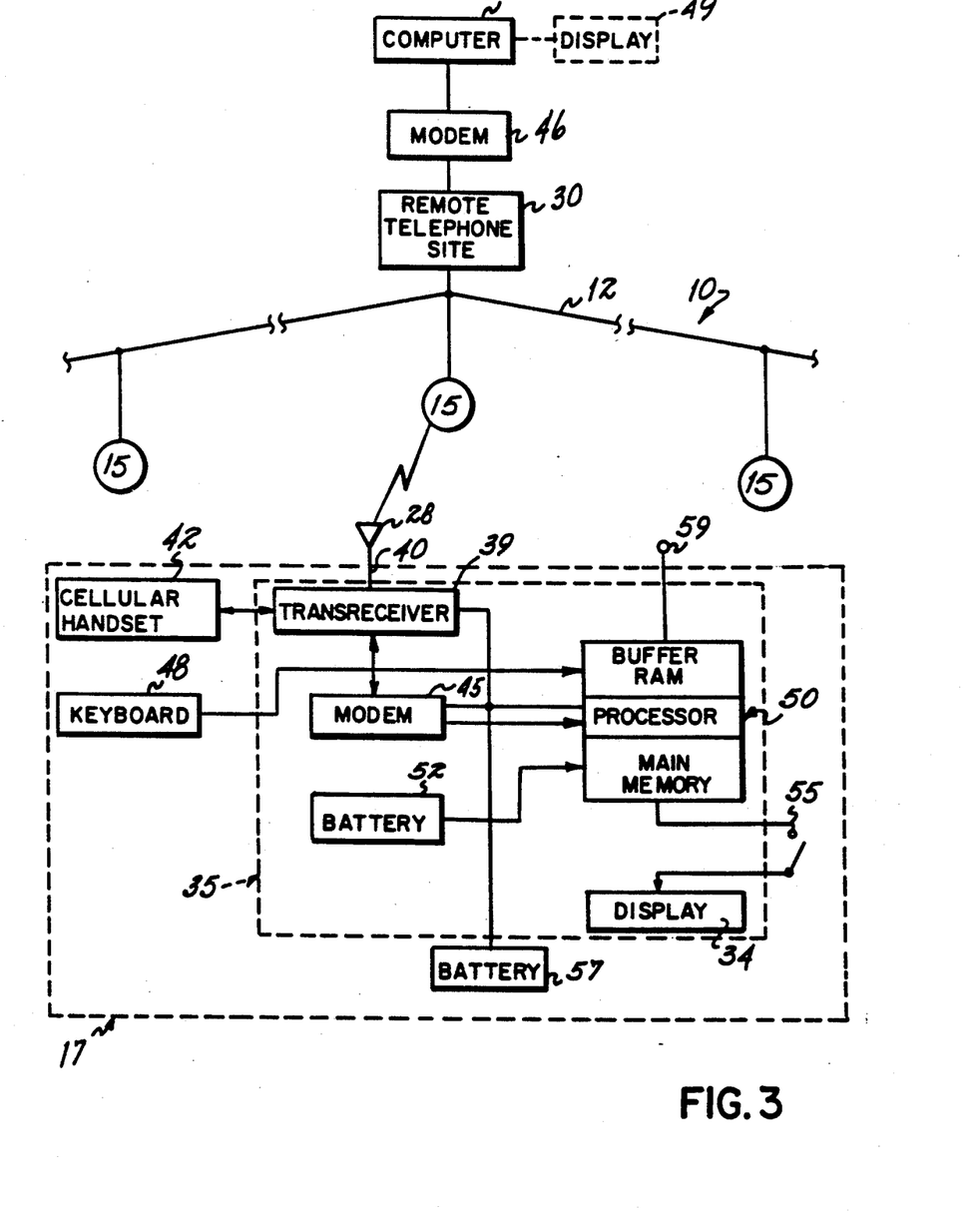
FIG. 3 is a schematic which shows the components of a communication system in accordance with a preferred embodiment of the invention.

The other components of the cellular based visual communication unit 27 that are housed within enclosure 35 are shown more clearly in FIG. 3. A cellular transceiver 39 receives radio signals detected by antenna 28 and conveyed via electrical connector 40. The connector 40 is housed within a cable that passes through the ceiling 36 of the vehicle and a sidewall of enclosure 35. A Motorola AC-110,3 watt cellular telephone transceiver has proved suitable for the purposes of this invention. The transceiver 39 preferably includes a conventional telephone jack mounted to the exterior of housing 35. This enables selectable connecting of a cellular telephone handset 42 to the unit 27 to allow audible communication between an individual on the bus and someone located at any other telephone in the system 10. To utilize the audible mode, transceiver 39 preferably includes a switch (not shown) to route signals either to handset 42 or to a modem 45.

The modem 45 is preferably of the type disclosed in O'Sullivan U.S. Pat. No. 4,697,281, entitled "Cellular Telephone Data Communication System and Method" owned by Spectrum Cellular Communication Corporation, Inc., and expressly incorporated herein by reference in its entirety. This system assures error-free transmission of digital data from the remote computer 32 to the cellular based visual communication unit 27, a feature which is absolutely critical to coherent message display onboard vehicles. Otherwise, normal hand off during vehicle travel would disrupt the continuity of the transmitted message and result in the display of an error-plagued message. As stated in the Spectrum patent beginning at column 1, line 64 through column 2, line 4: "[A] wire line modem for use with normal telephone equipment will disconnect upon experiencing a carrier signal loss. Thus, such a modem, when used with a cellular telephone system, will disconnect each time the vehicle in which the modem is mounted travels between cells, for some carrier loss will also be experienced when the radio signal used for cellular telephone communication is switched between the low power transmission stations of adjacent cells." The Spectrum modem, sold under the trademark BRIDGE, enables a personal computer to receive and transmit data via the cellular network in an error-free condition, thus providing telephone access to a user of a personal computer without requiring that he or she be located at a land line telephone site.

According to this invention, modem 45 corresponds to the mobile data programming interface of U.S. Pat. No. 4,697,281 (reference number 28 therein) and communicates with another modem 46 located at remote telephone site 30. The remote modem 46 corresponds to the static data programming interface of U.S. Pat. No. 4,697,281 (reference number 42 therein). Modem 46 includes an RS-232 interface which converts the parallel 8-bit data from the computer 32 into a modulated analog data stream to be transmitted through the telephone system 10. Modem 45 demodulates the received analog signal and an RS-232 interface converts the demodulated binary data stream into 8-bit parallel mode for input into a microprocessor 50. The modem 45 on the bus and the remote modem 46 cooperatively ensure that the binary data stream received and stored corresponds to, or is exactly the same as, the binary data stream that was input into computer 32 and transmitted from remote site 30. As noted previously, this binary data represents a route specific message to be displayed onboard the vehicle. A keyboard 48 is also connected to the processor 50 of the unit 27, to enable data transmission from the vehicle to the remote telephone site 30 or any other addressable site in the telephone system 10. A display 49 may also be connected to computer 32 to enable an operator to see what has been input and transmitted from site 30.

While various types of processors could be employed for purposes of the invention, an Hitachi 64180 has worked well with prototype units. The processor 50 has a minimum 32K buffer RAM capacity, but is preferably expandable up to 256K with processor addressability up to 512K. The additional memory enables both text and graphics to be displayed by the message board 34. Power to the components of unit 27 is supplied by the vehicle battery 57. Back up power to the memory within enclosure 35 is supplied by a 5 volt d.c. battery 52 mounted therein, in case battery 57 fails. Thus, route specific messages can be transmitted to the vehicle and stored in the buffer memory when the engine is turned off.

As described previously, once the entire message has been stored in the buffer, an imbedded command transfers the message to the main memory of the microprocessor 50. Messages displayed on board 34 are read from the main memory. If desired, power can be supplied selectively to the display board 34 via a switch 55, mounted proximate the driver of the vehicle. A thermometer 59 may also be mounted to the exterior of the vehicle and connected to microprocessor 50 to display the outside temperature. Additionally, a clock in the microprocessor may display the time of day on board 34.

The components of unit 27 are preferably removably secured to the inside walls of enclosure 35. The mounted components are then vibration and temperature tested prior to installation in a vehicle, thereby insuring that the wear and tear of everyday use on a mass transit vehicle will not adversely affect the system.

Figure 4:
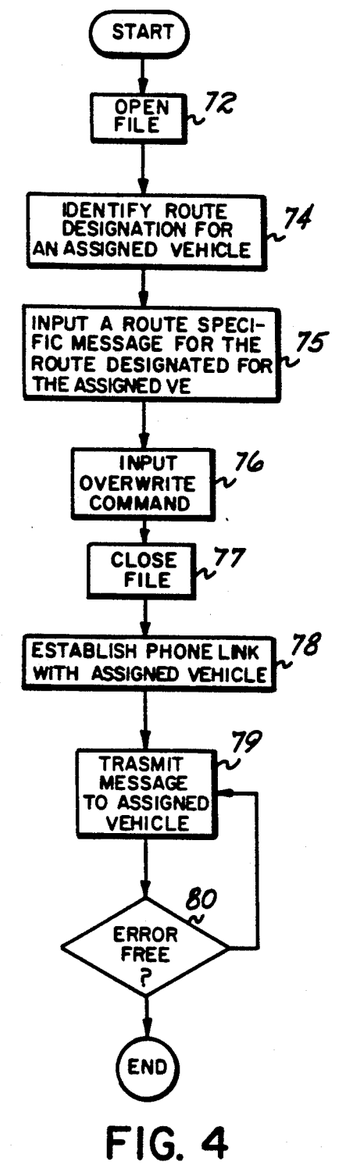
FIG. 4 is a flowchart which depicts a preferred sequence of operation that occurs at a remote telephone site in order to display messages onboard mass transit vehicles in accordance with a preferred embodiment of the invention.
Figure 5:
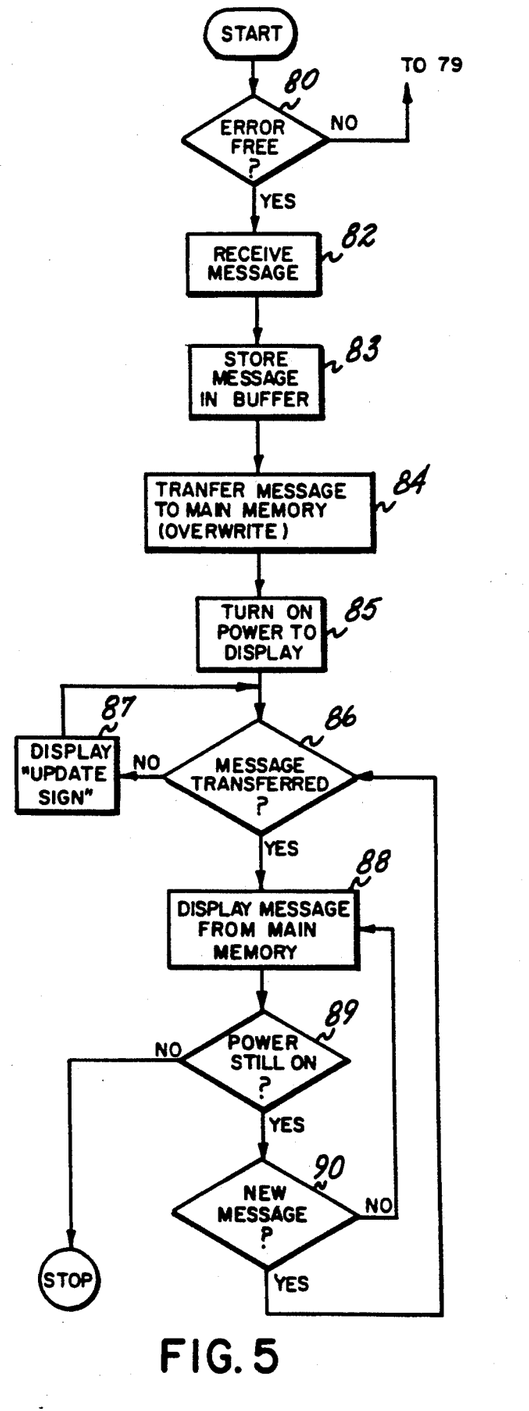
FIG. 5 is a flowchart similar to FIG. 4, which depicts a preferred sequence of operation that occurs onboard each vehicle in order to display a message in accordance with a preferred embodiment of the invention.

A sequence of operation in accordance with a preferred embodiment of the invention is shown in FIGS. 4 and 5, FIG. 4 showing operations which occur at remote telephone site 30, and FIG. 5 showing the operations that occur at the cellular based visual communication unit 27 mounted onboard one of the vehicles 17-20. In FIG. 4, an operator at remote site 30 initiates the sequence by turning on the power to the computer 32 and opening a file therein as shown in block 72. Next, the operator identifies a route designation for an assigned vehicle, as shown in block 74. During the next step 75, the operator inputs into the computer 32 the contents of a route specific message for the designated route to which the vehicle has been assigned. The operator also enters an overwrite command which is embedded within the message, as shown in block 76. This command, when received by the cellular based visual communication unit 27, will indicate the end of the message to the processor 50, whereupon the message will be transferred from the buffer memory of the processor 50 to the main memory. The operator also inputs a format command to select the type of display, i.e., scroll, wipe, etc. Afterward, the operator closes the file, as shown in block 77. After establishing a telephone link with the assigned vehicle, block 78, the message is transmitted to the assigned vehicle, as shown in block 79. Error-free transmission of the message requires communication between modem 46 at remote site 30 and modem 45 at the vehicle. Thus, the error-free checking shown in query 80 represents two way communication between the remote site 30 and cellular unit 27. This communication continues until the binary data stream corresponding to the contents of the desired message is received in error-free condition by modem 45.

Figure 6:
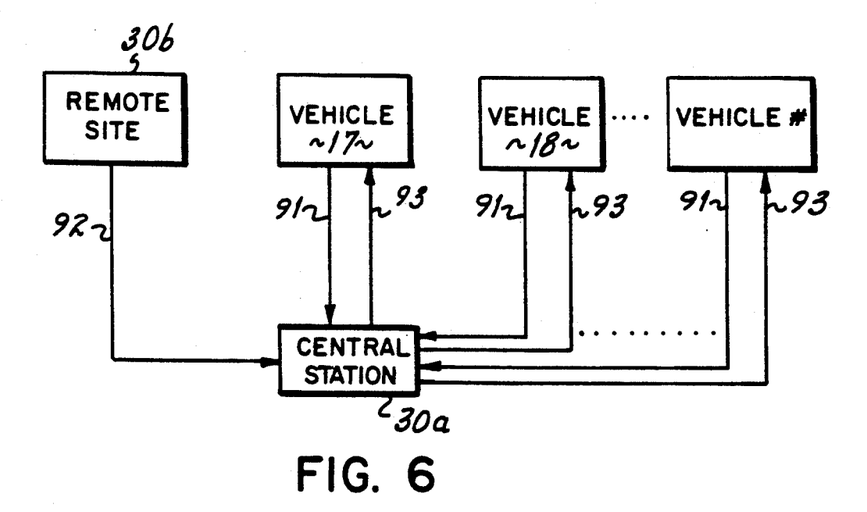
FIG. 6 is a block schematic which depicts a communication system for displaying messages onboard mass transit vehicles in accordance with an alternate embodiment of the invention.

FIG. 5 shows the sequence of operations which occur at the cellular based visual communication unit 27, with the understanding that, as stated above, query 80 represents two way communications between both sites. After receipt of an error-free message, shown in block 82, the microprocessor 50 stores the message in the buffer memory, as shown in block 83. Transmission of data occurs at an effective rate of 1,200 baud (bits per second) regardless of whether the vehicle is stationary with the ignition turned off, stationary with the ignition turned on, or moving from one geographical cell to the next geographical cell along a designated route. Storing of the message in the buffer memory does not effect display of the previous message stored in the main memory. However, upon completion of storage of the subsequent message by the buffer memory, the contents of the subsequent message are "written over" to the main memory of the microprocessor 50, as shown in block 84. Block 85 indicates that power to the display 34 has been turned on. Block 86 queries whether transfer is complete. If not, the display board 34 may display the message "Updating sign," as shown in block 87, as shown in FIG. 6. Upon completion of transfer of the subsequent message to the main memory, the display board 34 will commence display of the subsequent, updated message, as shown in block 88. If power is subsequently turned off, query 89, the sequence will terminate. After the entire message has been displayed, unless and until a further subsequent message is received and stored in the main memory, the message in the main memory will be continuously repeated, as indicated by the loop initiated by query 90.

FIG. 6 schematically shows a communication system for displaying route specific messages onboard mass transit vehicles according to an alternative embodiment of the invention. According to this embodiment, an individual on each vehicle transmits a route designation/bus telephone number pair to a control station located at a remote telephone site 30a within the system 10. This transmission is indicated by reference number 91. At the control station, each received route designation/bus telephone number pair is stored in a definable memory slot set aside for a particular route designation. In other words, a computer located at remote site 30a has at least one definable memory slot for each route designation used by the transit company.

Independently of the route designation/bus telephone number pairs, an operator located at yet another remote telephone site 30b enters and transmits a message to each of the definable memory slots located in the computer at location 30a. This transmission is indicated by reference arrow 92. Transmission to the correct memory slots is assured by also imbedding within each transmitted message both the known telephone number for the remote site 30a and the known address for the definable memory slot that has been dedicated to the designated route on which the message is to be displayed.

After a definable memory slot has received and stored both the route designation/vehicle telephone number pair from the vehicle and the message from the operator at 30b, the stored information in the memory slot is transmitted to the appropriate vehicle. This transmission is indicated by reference arrow 93. Because the previously stored route designation/vehicle telephone number has the addressable code, i.e., the telephone number, of a vehicle imbedded therein, the appropriate message is automatically transferred to the appropriate vehicle. In other words, this system alleviates the need to match up the designated routes, vehicle telephone numbers and messages at remote site 30a in order to assure display of the correct messages on the correct routes.

If desired, this final transmission from each of the definable memory slots to the appropriate vehicles can be performed automatically by the computer at remote site 30a. To accomplish this, each definable memory slot has an AND gate associated therewith, and the paired route designation/vehicle telephone number from a vehicle, arrow 91, serves as one input to the AND gate with the content of a message from site 30b, arrow 92, serving as the other input. Upon reception and storage of both of these communications, the output of the AND gate, arrow 93, goes high to activate a transmitter to automatically send all of the stored information to the vehicle telephone number imbedded in the vehicle transmitted route designation/vehicle telephone number pair. Similarly, messages to the other vehicles are handled in the same manner. If desired, for security purposes, the computer at site 30a may be programmed to store and transmit only information that contains a recognized identification number, thereby limiting access to the system in order to prevent interferences with display of appropriate messages.

Note in FIG. 1 that endpoint 23b of route 23 is located beyond the cellular network 12. This shows that the system allows route specific messages to be displayed on buses that traverse routes that extend beyond geographical area 11. However, for this situation, each route specific message for a bus travelling on route 23 must be transmitted to the bus when it is within one of the cells 14.

While the communication system of this invention has been described with respect to displaying updated route specific messages onboard a plurality of mass transit vehicles, the cellular based visual communication unit 27 may be adapted to a wide variety of other uses. For instance, a unit 27 could be placed at a location 99 that is inaccessible to conventional land lines of the telephone system 10, but within a geographical area 11 served by the cellular network 12, as shown in FIG. 1. Updated information, i.e., news, traffic, weather, advertising, could then be transmitted to the unit 27 from a remote telephone site 30, stored, and subsequently displayed. Units 27 could be adapted for use as either mobile or stationary billboards along roadways, portable signs removably attachable to kiosks in areas of heavy pedestrian traffic, or mounted near departure gates in airports. For these applications, the size of the display board 34 may vary. Error-free signal checking would also be provided because, as explained in the background section, hand off can occur for a non-moving cellular telephone. This system would provide display of messages transmitted through to the phone system 10 without requiring routing of a hard wire telephone line connection.

While a preferred embodiment of the invention has been described, applicant does not wish to be limited thereby, and it is to be understood that various modifications could be made without departing from the spirit of the invention. Accordingly, it is to be understood that changes may be made without departing from the scope of the invention as particularly set out and claimed.

I claim:

1. A communication system for message display onboard mass transit vehicles comprising:
    a plurality of mass transit vehicles operating within a geographical area serviced by a cellular telephone network, the cellular telephone network being interconnected with the telephone system, each said vehicle being periodically assigned for passenger service along a designated route located within said geographical area, each of said vehicle equipped with a plurality of passenger seats;
    means for generating a plurality of route specific messages and transmitting route specific messages to said vehicles via the cellular telephone network from any telephone located remotely in said system; and
    a cellular based visual communication unit located within each of said vehicles in a position that is viewable from a plurality of passenger seats in the vehicle, each said unit being operatively connected to said telephone system via said cellular network and adapted to receive and store, both during passenger service on a designated route and prior thereto, a route specific message particular to the designated route to which the vehicle has been assigned;
    each cellular based visual communication unit adapted to subsequently display the stored message during passenger service along the assigned route.

2. The communication system of claim 1 wherein said transmitting means and said cellular based visual communication unit cooperatively assure error-free transmission and reception of said messages via said cellular network, regardless of whether or not the vehicles are mobile or stationary.

3. The communication system of claim 2 wherein each said cellular based visual communication unit further comprises:
   a cellular transceiver adapted to receive a message;
   a cellular data modem operatively connected to said transceiver to demodulate said received message;
   a microprocessor operatively connected to the modem, the microprocessor having a buffer memory to immediately store said received message, and a main memory into which said received and stored message is transferred from said buffer memory; and
   a display board operatively connected to the microprocessor to display said message stored in said main memory to passengers onboard said vehicle.

4. The communication system of claim 3 wherein power to each said unit is supplied by the conventional vehicle power supply and further comprising:
   a back up power supply connected to said microprocessor to ensure storage of said message if said vehicle power supply should fail.

5. The communication system of claim 4 and further comprising:
   a switch for selectively connecting power to said display to initiate display of said message onboard said vehicle.

6. The communication system of claim 1 and further comprising:
   means for sensing temperature exterior of said vehicle; and
   means for displaying said sensed temperature via said telephone unit.

7. A communication system for mass transit vehicles comprising:
   a plurality of mass transit vehicles operating within a geographical area serviced by a cellular telephone network, the cellular telephone network being interconnected with the telephone system, each said vehicle being periodically assigned for passenger service along a designated route located within said geographical area, each said vehicle equipped with a plurality of passenger seats;
   a generator/transmitter connectable to a telephone located anywhere in said system and adapted to generate and transmit digital signals to any addressable code in said system, each digital signal corresponding to a message;
   a cellular based visual communication unit located within each of said vehicles in a position that is viewable from a plurality of passenger seats, each said unit having an addressable code within said system and being operatively connected with said telephone system via said cellular network; and
   each said unit including means for receiving and storing, both during passenger service on a designated route and prior thereto, a digital signal intended to be appropriate to the designated route to which the respective vehicle has been assigned, each signal being sent from said generator/transmitter via the cellular telephone network to the addressable code of the respective unit, the generator/transmitter and each said respective receiving means cooperatively ensuring error-free reception of the respective digital signal;
   each said unit further including means for subsequent selective display during passenger service of a route specific message corresponding to the respective received and stored digital signal.

8. The message display system of claim 7 further comprising:
   means selectively connectable to each said telephone unit for transmitting a route designation from onboard each of said vehicles to said generator/transmitter.

9. A method for communicating messages for display onboard mass transit vehicles comprising the steps of:
   operatively linking each of a plurality of mass transit vehicles with a telephone system via a cellular based visual communication unit mounted in each of said vehicles, each said vehicle being periodically assigned to a designated route within a geographical area serviced by a cellular telephone network;
   generating and transmitting alphanumeric route specific messages to said vehicles via the cellular telephone network, the transmissions originating from a remotely located telephone connected to the system; and
   receiving, storing and subsequently displaying the alphanumeric route specific messages onboard the mass transit vehicles, each received, stored and displayed route specific message being particular to a designated route to which the respective vehicle has been assigned.

10. The method of claim 9 wherein said transmitting and receiving steps cooperatively provide error-free receipt of said messages.

11. The method of claim 10 wherein said displayed messages include both text and graphics.

12. The method of claim 9 and further comprising the step of:
   periodically updating the route specific messages based upon periodic updates of the vehicle route assignments.

13. The message of claim 9 and further comprising the step of:
   communicating from each of said vehicles a route designation to a known location from which said transmitting step is to be performed.

14. The method of claim 9 wherein said vehicles are periodically assigned to designated routes at least partially within said geographical area and said transmitting and said receiving and storing steps are performed while said vehicles are located in said geographical area.

15. The method of communicating messages for display onboard a plurality of mass transit vehicles which are periodically assigned for passenger service along designated routes, comprising the steps of:
   a) transmitting data corresponding to an addressable code number and a route designation pair from each of said vehicles to a central station, each said transmission occurring via a cellular based visual communication unit onboard the vehicle and each addressable code number corresponding to the telephone number of the cellular based visual communication unit onboard the vehicle, the central station being interconnected with a telephone system and a cellular network within the system;
   b) storing in a definable memory slot at said station the data corresponding to each transmitted addressable code and route designation pair, each of said definable memory slot being dedicated to a designated route;

c) transmitting data corresponding to the alphanumeric contents of a route specific message from any telephone to each said definable memory slot at said central station;

d) storing in said definable memory slots said data corresponding to said route specific messages;

e) transmitting, via the cellular telephone network from said central station, the contents stored during steps b) and d) from each of said definable memory slots to the vehicle having the addressable code number stored therein;

f) receiving and storing at each of said cellular based visual communication units, the contents transmitted from the definable memory slot having the addressable code number of the respective unit stored therein, steps e) and f) being performed in a manner which assures error-free receipt and storage of said messages by said units, for each vehicle, the steps a) through f) being performable both prior to and during passenger service along a designated route; and g) subsequently displaying said stored messages on-board said vehicles during passenger service along an assigned route.

16. The method of claim 15 wherein step e) is performed automatically by said control station upon completion of steps a) through d).

* * * * *